US00RE42721E

(19) United States
(12) Reissued Patent
Godfrey

(10) Patent Number: US RE42,721 E
(45) Date of Reissued Patent: Sep. 20, 2011

(54) TRANSMIT REQUEST SIGNALING BETWEEN TRANSCEIVERS

(75) Inventor: Timothy Gordon Godfrey, Overland Park, KS (US)

(73) Assignee: Xocyst Transfer AG L.L.C., Wilmington, DE (US)

(21) Appl. No.: 12/317,669

(22) Filed: Dec. 23, 2008

Related U.S. Patent Documents

Reissue of:
(64) Patent No.: 7,155,232
Issued: Dec. 26, 2006
Appl. No.: 10/680,888
Filed: Oct. 8, 2003

U.S. Applications:
(60) Provisional application No. 60/452,309, filed on Mar. 5, 2003.

(51) Int. Cl.
*H04Q 7/20* (2006.01)

(52) U.S. Cl. ..... 455/450; 455/509; 455/41.2; 370/338

(58) Field of Classification Search ..... 455/450, 455/509, 516, 452.1, 41.2, 435.1, 552.1, 455/67.11, 67.13, 41.1, 63.1; 370/337, 338, 370/310
See application file for complete search history.

(56) References Cited

U.S. PATENT DOCUMENTS

| | | | | |
|---|---|---|---|---|
| 4,716,408 | A * | 12/1987 | O'Connor et al. | 370/452 |
| 6,842,607 | B2 | 1/2005 | Godfrey et al. | |
| 7,072,616 | B2 | 7/2006 | Godfrey | |
| 7,190,679 | B2 * | 3/2007 | Khawand et al. | 370/278 |
| 2002/0018143 | A1 | 2/2002 | Tarnoff et al. | |
| 2002/0093929 | A1 | 7/2002 | Mangold et al. | |
| 2002/0105930 | A1 | 8/2002 | Sydon et al. | |
| 2002/0181435 | A1 | 12/2002 | Miklos et al. | |
| 2003/0181212 | A1 * | 9/2003 | Wentink et al. | 455/450 |
| 2003/0214916 | A1 * | 11/2003 | Khawand et al. | 370/278 |
| 2004/0141496 | A1 * | 7/2004 | Wentink | 370/354 |
| 2004/0162024 | A1 * | 8/2004 | Wentink | 455/41.2 |
| 2004/0180622 | A1 | 9/2004 | Godfrey | |
| 2004/0264397 | A1 * | 12/2004 | Benveniste | 370/311 |
| 2005/0249136 | A1 * | 11/2005 | Fischer et al. | 370/310 |

FOREIGN PATENT DOCUMENTS

| | | |
|---|---|---|
| WO | WO-02/13429 | 2/2002 |
| WO | WO 02/13429 A1 | 2/2002 |
| WO | WO-03/007550 | 1/2003 |
| WO | WO 03/007550 A2 | 1/2003 |

OTHER PUBLICATIONS

International Preliminary Report on Patentability for PCT/US2004/006569, issued Sep. 9, 2005.

(Continued)

*Primary Examiner* — Tan Trinh

(57) ABSTRACT

A technique is disclosed that enables both an IEEE 802.11 transceiver and a Bluetooth transceiver to be employed in a single wireless telecommunication station (e.g., a device supporting a wireless telephone, personal digital assistant, etc.) without interfering on each other. In particular, the illustrative embodiment enables standard "off-the-shelf" IEEE 802.11 and Bluetooth transceivers to work in a coordinated fashion in a single telecommunications terminal. In the illustrative embodiment, a Bluetooth transceiver gains access to a shared-communications channel from an IEEE 802.11 transceiver by requesting access, even if the access is not immediate. The technique disclosed is also applicable to communications protocols other than IEEE 802.11 and Bluetooth.

51 Claims, 4 Drawing Sheets

OTHER PUBLICATIONS

International Search Report and Written Opinion for PCT/US2004/006569, mailed Jan. 3, 2005.

Mangold, Stephan et al., "Co-existense and Internetworking of IEEE 802.11a and ESTI BRAN HiperLAN/2 in MultiHop Scenarios" IEEE Workshop on Wireless Local Area Networks, Sep. 2000, pp. 1-7.

Stefan Mangold et al., Co-existence and Internetworking of IEEE 802.11a and ETSI BRAN HiperLAN/2 in MultiHop Scenarios, IEEE Workshop on Wireless Local Area Networks, Sep. 2001, pp. 1-7, XP002245928, New York, NY, USA.

* cited by examiner

TRANSMIT REQUEST SIGNALING BETWEEN TRANSCEIVERS

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of:

1. U.S. provisional application Ser. No. 60/452,309, filed 5 Mar. 2003, entitled "Blue802 Polite Request"

which is also incorporated by reference.

The following patent applications are incorporated by reference:

1. U.S. patent application Ser. No. 10/444,383, entitled "Multi-Protocol Interchip Interface"
2. U.S. patent application Ser. No. 10/444,519, entitled "Coordination of Competing Protocols," and
3. U.S. patent application Ser. No. 10/680,877, entitled "Coordinating Multiple Air-Interface Subsystems that Serve a Common Host"

FIELD OF THE INVENTION

The present invention relates to telecommunications in general, and, more particularly, to wireless local area networks.

BACKGROUND OF THE INVENTION

FIG. 1 depicts a schematic diagram of local area network 100 in the prior art, which comprises telecommunication stations 101-1 through 101-K, wherein K is a positive integer, and shared-communications channel 102, interconnected as shown. Stations 101-1 through 101-K enable associated host computers to communicate blocks of data, or "frames," to each other. Stations 101-1 through 101-K comprise transceivers that enable communications via shared-communications channel 102.

In a mixed network such as local area network 100, some of the stations (e.g., station 101-1, etc.) operate in accordance with the IEEE 802.11 set of protocols, and some of the stations (e.g., station 101-4, etc.) operate in accordance with the Bluetooth set of protocols. Still other stations of local area network 100 operate in accordance with both protocols. The stations comprising transceivers that communicate in accordance with IEEE 802.11 are able to take turns accessing shared-communications channel 102 because they all embody IEEE 802.11 access rules and follow those rules. Similarly, the stations comprising transceivers that communicate in accordance with Bluetooth are able to take turns accessing shared-communications channel 102 because they all embody Bluetooth access rules and follow those rules.

When IEEE 802.11 transceivers and Bluetooth transceivers—situated either in separate stations or within the same station—have to use the same, shared-communications channel (i.e., shared-communications channel 102), the rules for accessing (and sharing) shared-communications channel 102 are not as well defined as for the case where all transceivers use the same protocol. For example, Bluetooth station 101-4 might attempt to transmit when IEEE 802.11 station 101-1 is already transmitting, and the result would most likely be that neither station successfully transmits during that particular attempt. Depending on the contention for shared-communications channel 102, neither the Bluetooth stations nor the IEEE 802.11 stations would operate effectively enough to be of much value to the end user.

Therefore, the need exists for a way to coordinate multiple air interface protocols that are used to access the same, shared-communications channel without some of the disadvantages in the prior art.

SUMMARY OF THE INVENTION

The present invention enables both an IEEE 802.11 transceiver and a Bluetooth transceiver to be employed in a single telecommunication station without the transceivers interfering on each other. In particular, the illustrative embodiment enables standard, "off-the-shelf," IEEE 802.11 and Bluetooth transceivers to work in a coordinated fashion in a single telecommunications station. In some embodiments, the two transceivers are in separate stations.

In the illustrative embodiment, a Bluetooth transceiver notifies an IEEE 802.11 transceiver that is using a shared-communications channel that the Bluetooth transceiver needs to use the shared-communications channel, though not necessarily immediately. The channel access control mechanism associated with the IEEE 802.11 transceiver determines when to relinquish control of the shared-communications channel to the Bluetooth transceiver and then grants the Bluetooth transceiver's request to use the shared-communications channel. The IEEE 802.11 transceiver can choose to (i) power down or (ii) stay powered up when it relinquishes control of the shared-communications channel.

In some embodiments, the Bluetooth transceiver notifies the IEEE 802.11 transceiver when the Bluetooth transceiver finishes using the shared-communications channel. In other embodiments, the Bluetooth transceiver notifies the IEEE 802.11 transceiver in advance when the Bluetooth transceiver begins to finish using the shared-communications channel. The Bluetooth transceiver in those other embodiments then continues to use the shared-communications channel during the recovery period when the IEEE 802.11 transceiver transitions from a powered down to a powered up condition.

In this specification, the illustrative embodiment is disclosed in the context of the IEEE 802.11 and Bluetooth protocols. It will be clear to those skilled in the art, however, how to make and use alternative embodiments of the present invention for other combinations of competing protocols (i.e., protocols that might interfere with each other). In addition, although the illustrative embodiment is disclosed in the context of radio transceivers, it will be clear to those skilled in the art how to make and use alternative embodiments of the present invention for non-radio frequency wireless devices or wireline transceivers that might interfere with each other.

The illustrative embodiment of the present invention comprises: asserting a polite request signal that requests that a first transceiver relinquish transmitting via a shared-communications channel, wherein the first transceiver communicates in accordance with a first communications protocol; indicating via the shared-communications channel that a second transceiver hold subsequent transmissions to the first transceiver; asserting a first signal from the first transceiver that indicates that the first transceiver has relinquished transmitting via the shared-communications channel; and transmitting at least one frame from a third transceiver via the shared-communications channel after the asserting of the first signal, wherein the third transceiver communicates in accordance with a second communications protocol.

DETAILED DESCRIPTION

Figure 1:
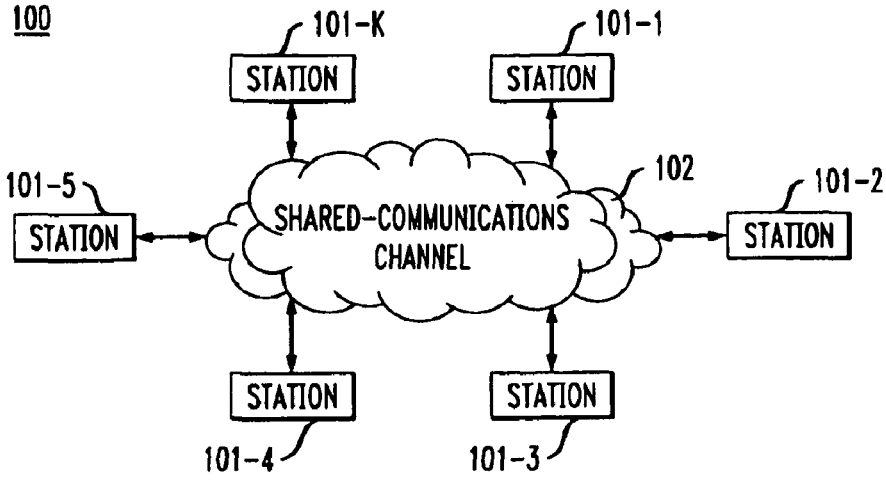
FIG. 1 PRIOR ART
FIG. 1 depicts a schematic diagram of wireless local area network 100 in the prior art.
Figure 2:
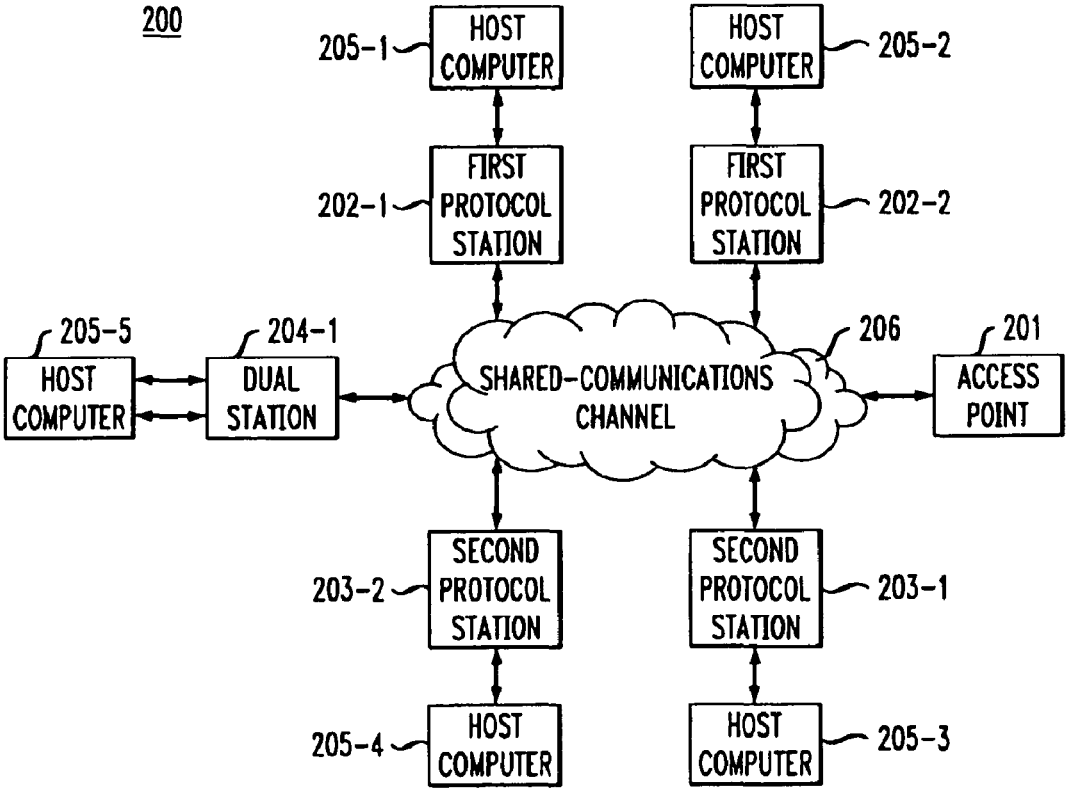
FIG. 2 depicts a schematic diagram of a portion of local area network 200 in accordance with the illustrative embodiment of the present invention.

FIG. 2 depicts a schematic diagram of a portion of local area network 200 in accordance with the illustrative embodiment of the present invention. Network 200 operates in accordance with the IEEE 802.11 and Bluetooth sets of protocols, and comprises access point 201, first protocol 802.11 stations 202-1 through 202-L, wherein L is a natural number; second protocol stations 203-1 through 203-M, wherein M is a natural number; dual protocol stations 204-1 through 204-N, wherein N is a natural number; host computers 205-1 through 205-P, wherein P is equal to the sum of L, M, and N; and wireless shared-communications channel 206, interconnected as shown.

FIG. 2 depicts a network configuration with L equal to two, M equal to two, and N equal to one. It will be clear, however, to those skilled in the art, after reading this specification, how to make and use embodiments of the present invention that use different values for L, M, and N.

In the examples provided in this specification, first protocol stations 202-1 through 202-L and second protocol stations 203-1 through 203-M are IEEE 802.11 and Bluetooth compliant, respectively. Furthermore, dual stations 204-1 through 204-N are both IEEE 802.11 and Bluetooth compliant. Access point 201, a coordinating station that is described below, is at least IEEE 802.11 compliant. In some embodiments, access point 201 is both IEEE 802.11 and Bluetooth compliant. It will be clear, however, to those skilled in the art, after reading this specification, how to make and use embodiments of the present invention that operate in accordance with other protocols. Furthermore, it will be clear to those skilled in the art, after reading this specification, how to make and use embodiments of the present invention that use a wireline or tangible shared-communications channel.

Access point 201 coordinates the communications of at least some of the stations within local area network 200. For example, first protocol stations 202-1 through 202-L and dual protocol stations 204-1 through 204-N, when using the protocol of first protocol stations 202-1 through 202-L, communicate with each other through access point 201. It will be clear to those skilled in the art how to make and use access point 201.

Each station comprises one or more transceivers that enable host computer 205-j, for j=1 to P, to transmit signals and receive signals via shared-communications channel 206. A "transceiver" is capable of two-way communication over a communications channel (e.g., shared-communications channel 206, etc.). For example, dual station 204-1 is capable of receiving data blocks from host computer 205-5 (i.e., the host computer with which dual station 204-1 is associated) and transmitting over shared-communications channel 206 data frames comprising the data received from host computer 205-5. Dual station 204-1 is also capable of receiving data frames from shared communications channel 206 and sending to host computer 205-5 data blocks comprising data from the data frames. It will be clear to those skilled in the art, after reading this specification, how to make and use dual station 204-1. The salient details for dual station 204-1 are described below and with respect to FIG. 3.

Host computer 205-j, for j=1 to P, is capable of generating data blocks and transmitting those data blocks to its associated station. Host computer 205-j is also capable of receiving data blocks from its associated station and of processing and using the data contained within those data blocks. Host computer 205-j can be, for example, a desktop computer, a laptop computer, a wireless telephone, or a personal digital assistant (PDA) that uses local area network 200 to communicate with other hosts and devices. It will be clear to those skilled in the art how to make and use host computer 205-j.

Figure 3:
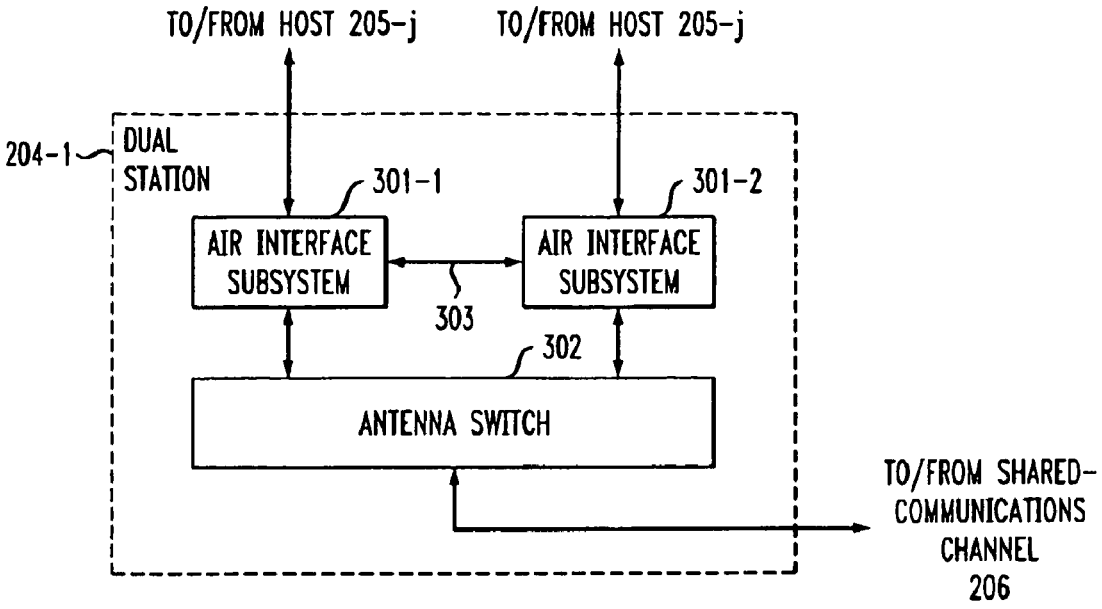
FIG. 3 depicts a block diagram of the salient components of dual station 204-1 in accordance with the illustrative embodiment of the present invention.

FIG. 3 depicts a block diagram of the salient components of dual station 204-1 in accordance with the illustrative embodiment of the present invention. Dual station 204-1 supports two distinct wireless air interface protocols for the purpose of transmitting and receiving data over the air via shared-communications channel 206. The wireless protocols supported by dual station 204-1 can be, for example, IEEE 802.11 and Bluetooth. Dual station 204-1 comprises: air interface subsystem 301-1, air interface subsystem 301-2, and antenna switch 302, interconnected as shown; Air interface subsystem 301-1 and air interface subsystem 301-2 communicate with each other via interface 303.

Air interface subsystem 301-i, for i=1 to Q wherein Q is a positive integer greater than one, enables associated host computer 205-j (i.e., host computer 205-5 paired with dual station 204-1) to communicate via shared-communications channel 206. In the illustrative example, Q is equal to two. It will be clear, however, to those skilled in the art, after reading this specification, how to make and use dual station 204-i with other values of Q.

Air interface subsystems 301-1 and 301-2 comprise the transceivers that enable host computer 205-j to communicate using two different air interface protocols. Each of air interface subsystems 301-1 and 301-2 operates in accordance with a different air interface protocol (e.g., IEEE 802.11, Bluetooth, etc.). It will be clear to those skilled in the art, after reading this specification, how to make and use air interface subsystems 302-1 and 302-2.

Antenna switch 302 enables air interface subsystems 301-1 and 301-2 to share a single antenna unit for the purpose of using shared-communications channel 206. Antenna switch 302 provides signals to air interface subsystem 301-i. Antenna switch 302 also accepts signals from air interface subsystem 301-i. It will be clear to those skilled in the art how to make and use antenna switch 302.

Figure 4:
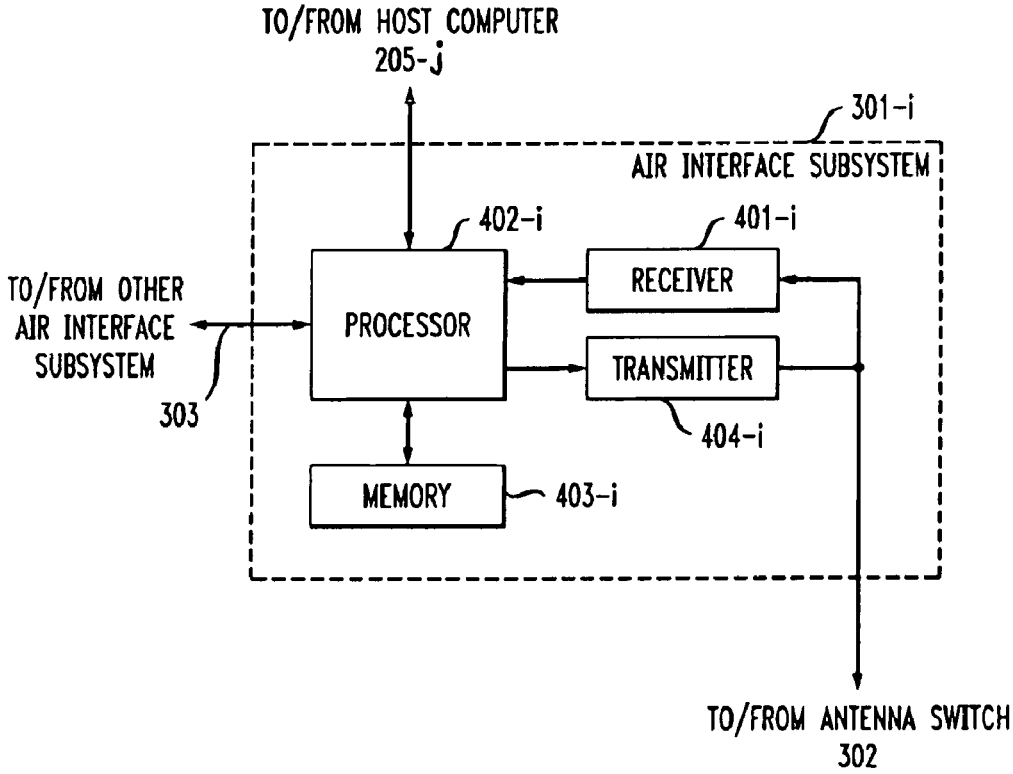
FIG. 4 depicts a block diagram of the salient components of air interface subsystem 301-i in accordance with the illustrative embodiment of the present invention.

FIG. 4 depicts a block diagram of the salient components of air interface subsystem 301-i in accordance with the illustrative embodiment of the present invention. Air interface subsystem 301-i comprises receiver 401-i, processor 402-i, memory 403-i, and transmitter 404-i, interconnected as shown.

Receiver 401-i is a circuit that is capable of receiving frames from shared-communications channel 206, in well-known fashion, and of forwarding them to processor 402-i. It will be clear to those skilled in the art, after reading this specification, how to make and use receiver 401-i.

Processor 402-i is a general-purpose processor that is capable of performing the tasks described below and with respect to FIGS. 5 through 9. Processor 402-i controls access to shared-communications channel 206 for air interface subsystem 301-i in accordance with the applicable air interface protocol. It will be clear to those skilled in the art, after reading this specification, how to make and use processor 402-i.

[Memory] *A tangible computer-readable medium such as memory* 403-i is capable of storing programs and data used by processor 402-i. It will be clear to those skilled in the art how to make and use memory 403-i.

Transmitter 404-i is a circuit that is capable of receiving frames from processor 402-i, in well-known fashion, and of transmitting them on shared-communications channel 206. It will be clear to those skilled in the art, after reading this specification, how to make and use transmitter 404-i.

The combination of receiver 401-i and transmitter 404-i constitutes the transceiver part of air interface subsystem 301-i.

Figure 5:
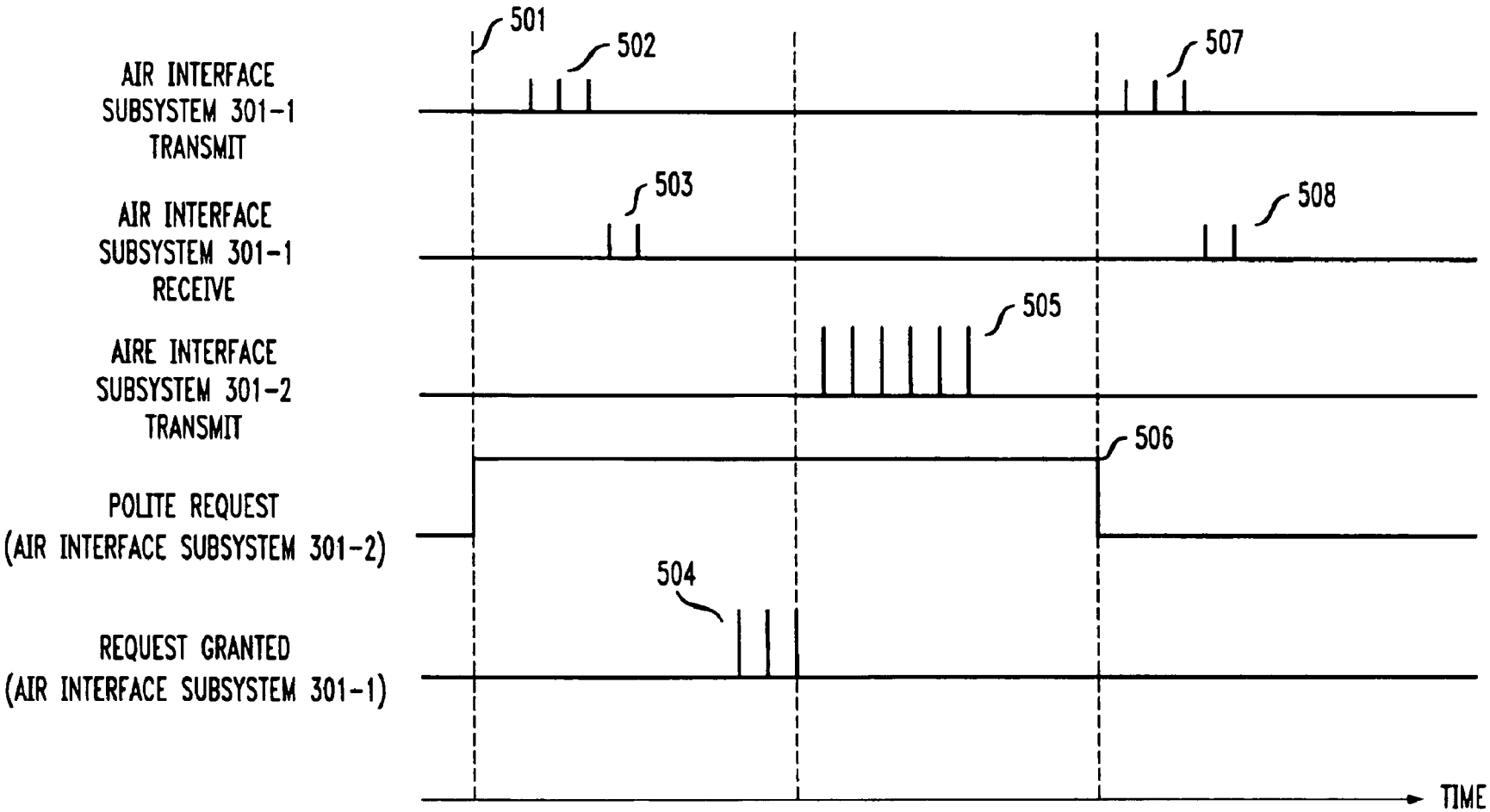
FIG. 5 depicts a timing diagram of signals exchanged between air interface subsystems 301-1 and 301-2, in accordance with the first illustrative embodiment of the present invention.

FIG. 5 depicts a timing diagram of signals exchanged between air interface subsystem 301-1 and 301-2, in accordance with the first illustrative embodiment of the present invention. In accordance with the first illustrative embodiment of the present invention, FIG. 5 depicts air interface subsystem 301-2 requesting that air interface subsystem 301-1 relinquish control of shared-communications channel 206, though not necessarily immediately. In this specification, this action is referred to as a "polite request." The polite request signal, when not asserted, also indicates when air interface subsystem 301-2 is not transmitting into shared-communications channel 206. Although air interface subsystems 301-1 and 301-2 of dual station 204-1 are used as examples, it will be clear to those skilled in the art how to apply the tasks represented in FIG. 5 of the illustrative embodiment to other air interface subsystems.

In some embodiments, signals are conveyed as discrete signal levels, and in other embodiments, signals are conveyed as packets. FIG. 5 depicts signals occurring in both forms. It will be clear to those skilled in the art, after reading this specification, how to represent in actual implementation the signals depicted in FIG. 5.

At time 501, air interface subsystem 301-2 asserts a polite request signal, which is subsequently detected by air interface subsystem 301-1. Asserting the polite request signal-indicates that air interface subsystem 301-2 needs to use shared-communications channel 206, though not necessarily immediately.

Air interface subsystem 301-1 detects the polite request signal being asserted by air interface subsystem 301-2. Air interface subsystem 301-1 can relinquish control of shared-communications channel 206 immediately, or it can defer relinquishing control. It will be clear to those skilled in the art how to determine when air interface subsystem 301-1 relinquishes control of shared-communications channel 206.

At time 502 when it is ready to relinquish control of shared-communications channel 206, air interface subsystem 301-1 indicates to access point 201 to hold data frames arriving from other sources and that are addressed to air interface subsystem 301-1. For example, the indication can be in the form of a message bit set to a value indicating that the transceiver of air interface subsystem 301-1 is entering a power save state in which air interface subsystem 301-1 powers down the transceiver. Air interface subsystem 301-1 can direct the action of powering down at the transmitter part, the receiver part, or both parts of the transceiver. In some embodiments, air interface subsystem 301-1 keeps its transceiver powered up, even though it informed access point 201 otherwise.

At time 503, air interface subsystem 301-1 receives an acknowledgement that access point 201 received the indication.

At time 504, air interface subsystem 301-1 sends a request granted signal to air interface subsystem 301-2 to indicate that air interface subsystem 301-1 yields shared-communications channel 206 and that air interface subsystem 301-2 can use shared-communications channel 206.

At time 505, air interface subsystem 301-2 begins using shared-communications channel 206 for transmitting, receiving, or both.

At time 506, air interface subsystem 301-2 determines that it is near the end of operation on shared-communications channel 206 and un-asserts the polite request signal. In some embodiments, air interface subsystem 301-1 as a result begins a recovery interval, which is a transition period that the transceiver goes through while powering up.

At time 507, air interface subsystem 301-1 informs access point 201 that air interface subsystem 301-1 has exited the power save state. For example, the PS-Poll frame is used in IEEE 802.11 for this purpose.

At time 508, air interface subsystem 301-1 receives an acknowledgement from access point 201. Air interface subsystem 301-1 proceeds to receive the data frames that have been held by access point 201 since time 502.

Figure 6:
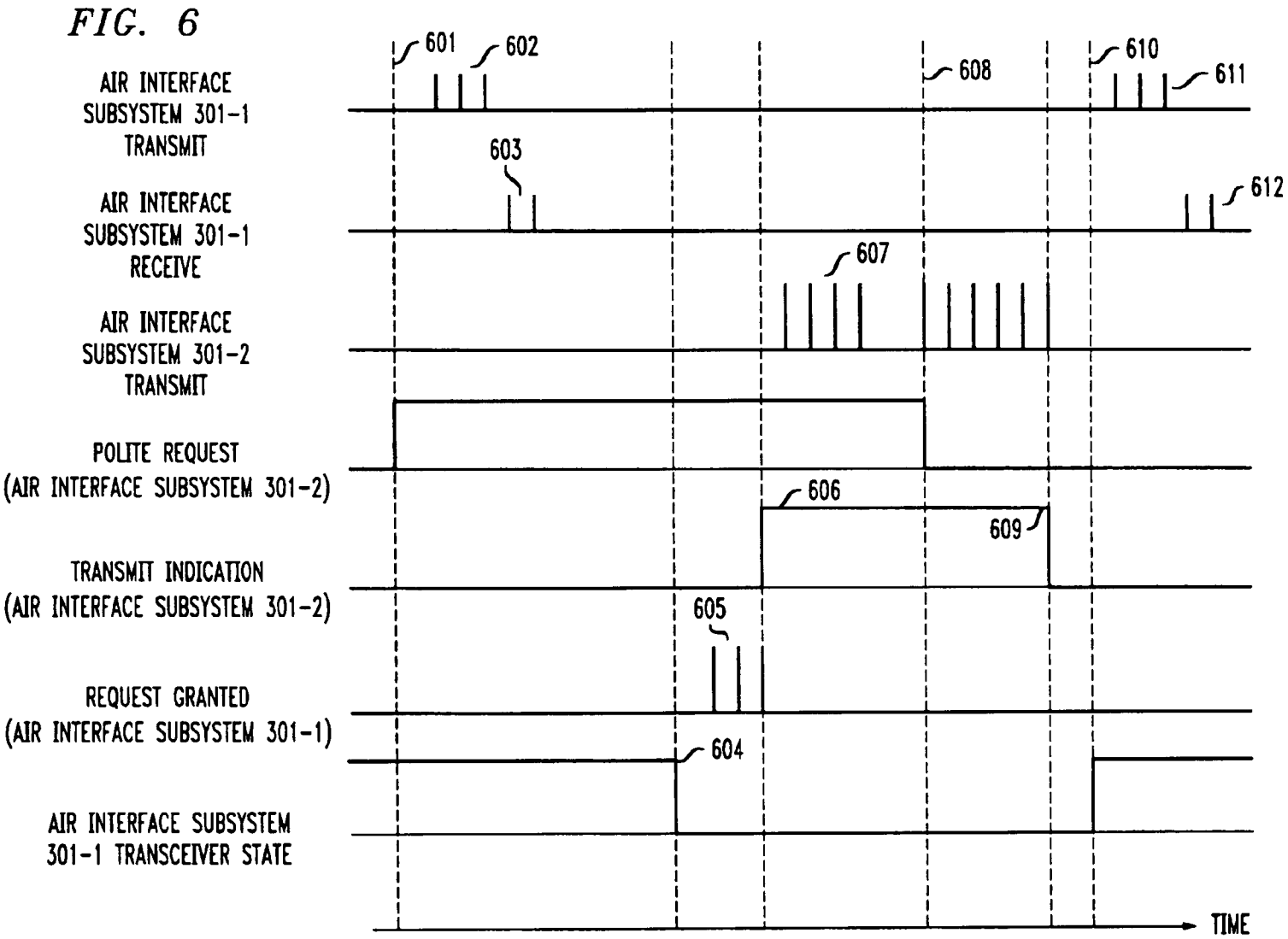
FIG. 6 depicts a timing diagram of signals exchanged between air interface subsystems 301-1 and 301-2, in accordance with the second illustrative embodiment of the present invention.

FIG. 6 depicts a timing diagram of signals exchanged between air interface subsystem 301-1 and 301-2, in accordance with the second illustrative embodiment of the present invention. In accordance with the second illustrative embodiment of the present invention, FIG. 6 depicts air interface subsystem 301-2 requesting that air interface subsystem 301-1 relinquish control of shared-communications channel 206, though not necessarily immediately. When it relinquishes control, air interface subsystem 301-1 enters and exits a power save state as described below. In the second illustrative embodiment of the present invention, air interface subsystem 301-2 uses separate polite request and transmit indications, which enable air interface subsystem 301-2 to continue transmitting while air interface subsystem 301-1 is exiting and recovering from the power save state. Although air interface subsystems 301-1 and 301-2 of dual station 204-1 are used as examples, it will be clear to those skilled in the art how to apply the tasks represented in FIG. 6 of the illustrative embodiment to other air interface subsystems.

In some embodiments, signals are conveyed as discrete signal levels, and in other embodiments, signals are conveyed as packets. FIG. 6 depicts signals occurring in both forms. It will be clear to those skilled in the art, after reading this specification, how to represent in actual implementation the signals depicted in FIG. 6.

At time 601, air interface subsystem 301-2 asserts a polite request signal, which is subsequently detected by air interface subsystem 301-1. Asserting the polite request signal indicates that air interface subsystem 301-2 needs to use shared-communications channel 206, though not necessarily immediately.

Air interface subsystem 301-1 detects the polite request signal being asserted by air interface subsystem 301-2. Air interface subsystem 301-1 can relinquish control of shared-communications channel 206 immediately, or it can defer relinquishing control. It will be clear to those skilled in the art how to determine when air interface subsystem 301-1 relinquishes control of shared-communications channel 206.

At time 602 when it is ready to relinquish control of shared-communications channel 206, air interface subsystem 301-1 indicates to access point 201 to hold data frames arriving from other sources and that are addressed to air interface subsystem 301-1. For example, the indication can be in the form of a message bit set to a value indicating that the transceiver of air interface subsystem 301-1 is entering the power save state in which air interface subsystem 301-1 powers down the transceiver.

At time 603, air interface subsystem 301-1 receives an acknowledgement that access point 201 received the indication.

At time 604, air interface subsystem 301-1 enters the power save state. Air interface subsystem 301-1 can direct the action of powering down at the transmitter part, the receiver part, or both parts of the transceiver. In some embodiments, air interface subsystem 301-1 keeps its transceiver powered up, even though it informed access point 201 otherwise.

At time 605, air interface subsystem 301-1 sends a request granted signal to air interface subsystem 301-2 to indicate that air interface subsystem 301-1 yields shared-communications channel 206 and that air interface subsystem 301-2 can use shared-communications channel 206.

At time 606, air interface subsystem 301-2 asserts the transmit indication signal.

At time 607, air interface subsystem 301-2 begins using shared-communications channel 206 for transmitting, receiving, or both.

At time 608, air interface subsystem 301-2 determines that it is near the end of operation on shared-communications channel 206 and un-asserts the polite request signal. In some embodiments, air interface subsystem 301-1 begins a recovery interval, which is a transition period that the transceiver goes through while powering up. Air interface subsystem 301-2 continues transmitting into shared-communications channel 206.

At time 609, air interface subsystem 301-2 ceases using shared-communications channel 206 and un-asserts the transmit indication signal.

At time 610, air interface subsystem 301-1 completes the powering-up recovery and exits the power save state in those embodiments in which it had entered the power save state. Air interface subsystem 301-1 detects the un-asserting of the transmit indication signal of air interface subsystem 301-2 and resumes using shared-communications channel 206 as needed.

At time 611, air interface subsystem 301-1 informs access point 201 that air interface subsystem 301-1 has exited the power save state. For example, the PS-Poll frame is used in IEEE 802.11 for this purpose.

At time 612, air interface subsystem 301-1 receives an acknowledgement from access point 201. Air interface subsystem 301-1 proceeds to receive the data frames that have been held by access point 201 since time 602.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:

asserting a polite request signal that requests that a first transceiver relinquish transmitting via a shared-communications channel, wherein said first transceiver communicates in accordance with a first communications protocol;

indicating via said shared-communications channel that a second transceiver hold subsequent transmissions to said first transceiver;

asserting a first signal that indicates that said first transceiver has relinquished transmitting via said shared-communications channel; and transmitting at least one frame from a third transceiver via said shared-communications channel after said asserting of said first signal, wherein said third transceiver communicates in accordance with a second communications protocol.

2. The method of claim 1 wherein said first transceiver is IEEE 802.11 compliant, said second transceiver constitutes an access point, and said third transceiver is Bluetooth compliant.

3. The method of claim 1 further comprising:

un-asserting said polite request signal;

detecting said un-asserting of said polite request signal; and indicating via said shared-communications channel and based on said detecting that said second transceiver send said subsequent transmissions to said first transceiver.

4. The method of claim 3:

wherein said asserting of said polite request signal also requests that said first transceiver enter a power save state;

wherein said asserting of said first signal also informs said second transceiver that said first transceiver has entered said power save state; and wherein said un-asserting of said polite request signal also requests that said first transceiver exit said power save state.

5. The method of claim 1 further comprising:

asserting a transmitting indication signal when said third transceiver is transmitting via said shared communications channel;

un-asserting said polite request signal after said asserting of said transmitting indication signal;

un-asserting of said transmitting indication signal after said un-asserting of said polite request signal;

detecting said un-asserting of said transmitting indication signal; and indicating via said shared-communications channel and based on said detecting that said second transceiver send said subsequent transmissions to said first transceiver.

6. The method of claim 5 further comprising transmitting at least one frame via said shared-communications channel from said third transceiver after said un-asserting of said polite request signal and before said un-asserting of said transmitting indication signal.

7. A method comprising:

notifying a first transceiver to exit a power save state, wherein said first transceiver communicates in accordance with a first communications protocol via a shared-communications channel;

asserting a transmitting indication signal that indicates that a second transceiver is transmitting via said shared communications channel in accordance with a second communications protocol; and transmitting at least one frame from said second transceiver after said notifying and before said first transceiver has recovered from said power save state.

8. The method of claim 7 further comprising:

un-asserting said transmitting indication signal; and transmitting at least one frame from said first transceiver via said shared communications channel after said first transceiver recovers from said power save state and after said un-asserting of said transmitting indication signal.

9. The method of claim 7 further comprising:

asserting a polite request signal that requests that said first transceiver enter said power save state; and asserting a first signal that indicates that said first transceiver has entered said power save state.

10. The method of claim 9 wherein said notifying comprises un-asserting said polite request signal.

11. An apparatus comprising:

a first air interface subsystem [for] *configured to*:

[(1) indicating] *indicate* via said shared-communications channel in accordance with a first communications protocol that a coordinating station hold subsequent transmissions to said first air interface subsystem; and

[(2) asserting] *assert* a first signal that indicates that said first air interface subsystem has relinquished transmitting via said shared-communications channel; and a second air interface subsystem [for] *configured to*:

[(1) asserting] *assert* a polite request signal that requests that said first air interface subsystem relinquish transmitting via a shared-communications channel; and

[(2) transmitting] *transmit* at least one frame via said shared-communications channel after said asserting of said first signal, in accordance with a second communications protocol;

wherein said first air interface subsystem and said second air interface subsystem are associated with the same host computer.

12. The apparatus of claim 11 wherein said first air interface subsystem is IEEE 802.11 compliant, said coordinating station is an access point, and said second air interface subsystem is Bluetooth compliant.

13. The apparatus of claim 11 wherein:

said second air interface subsystem is [also for un-asserting] *further configured to un-assert* said polite request signal; and said first air interface subsystem is [also for] *further configured to*:

[(1) detecting] *detect* said un-asserting of said polite request signal; and

[(2) indicating] *indicate* via said shared-communications channel and based on said detecting that said coordinating station send said subsequent transmissions to said first air interface subsystem.

14. The apparatus of claim 13:

wherein said asserting of said polite request signal also requests that the transceiver of said first air interface subsystem enter a power save state;

wherein said asserting of said first signal also informs said second air interface subsystem that said the transceiver of said first air interface subsystem has entered said power save state; and wherein said un-asserting of said polite request signal also requests that the transceiver of said first air interface subsystem exit said power save state.

15. The apparatus of claim 11 wherein:

said second air interface subsystem is also [for] *configured to*:

[(1) asserting] *assert* a transmitting indication signal when said second air interface subsystem is transmitting via said shared communications channel;

[(2) un-asserting] *un-assert* said polite request signal after said asserting of said transmitting indication signal; and

[(3) un-asserting of] *un-assert* said transmitting indication signal after said un-asserting of said polite request signal; and said first air interface subsystem is [also for] *further configured to*:

[(1) detecting] *detect* said un-asserting of said transmitting indication signal; and

[(2) indicating] *indicate* via said shared-communications channel and based on said detecting that said coordinating station send said subsequent transmissions to said first air interface subsystem.

16. The apparatus of claim 15 wherein said second air interface subsystem is [also for transmitting] *further configured to transmit* at least one frame via said shared-communications channel after said un-asserting of said polite request signal and before said un-asserting of said transmitting indication signal.

17. An apparatus comprising:

a station [for] *configured to*:

[(1) asserting] *assert* a polite request signal that requests that a first air interface subsystem relinquish transmitting via a shared-communications channel;

[(2) indicating] *indicate* via said shared-communications channel in accordance with a first communications protocol that a coordinating station hold subsequent transmissions to said first air interface subsystem;

[(3) asserting] *assert* a first signal that indicates that said first air interface subsystem has relinquished transmitting via said shared-communications channel; and

[(4) transmitting] *transmit* from a second air interface subsystem at least one frame via said shared-communications channel after said asserting of said first signal, in accordance with a second communications protocol; and a host computer [for providing] *configured to provide* a data block to said second air interface subsystem wherein said data block constitutes said at least one frame.

18. The apparatus of claim 17 wherein said first air interface subsystem is IEEE 802.11 compliant, said coordinating station is an access point, and said second air interface subsystem is Bluetooth compliant.

19. The apparatus of claim 17 wherein said station is [also for] *further configured to*:

[un-asserting] *un-assert* said polite request signal at said second air interface subsystem;

[detecting] *detect* said un-asserting of said polite request signal at said first air interface subsystem; and

[indicating] *indicate* via said shared-communications channel and based on said detecting that said coordinating station send said subsequent transmissions to said first air interface subsystem.

20. The apparatus of claim 19:

wherein said asserting of said polite request signal also requests that the transceiver of said first air interface subsystem enter a power save state;

wherein said asserting of said first signal also informs said second air interface subsystem that said the transceiver of said first air interface subsystem has entered said power save state; and wherein said un-asserting of said polite request signal also requests that the transceiver of said first air interface subsystem exit said power save state.

21. The apparatus of claim 17 wherein said station is [also for] *further configured to*:

[asserting] *assert* a transmitting indication signal at said second air interface subsystem when said second air interface subsystem is transmitting via said shared communications channel;

[un-asserting] *un-assert* said polite request signal after said asserting of said transmitting indication signal;

[un-asserting of] *un-assert* said transmitting indication signal after said un-asserting of said polite request signal;

[detecting] *detect* said un-asserting of said transmitting indication signal at said first air interface subsystem; and

[indicating] *indicate* via said shared-communications channel and based on said detecting that said coordinating station send said subsequent transmissions to said first air interface subsystem.

22. The apparatus of claim 21 wherein said station is [also for transmitting] *further configured to transmit* at least one frame via said shared-communications channel using said second communications protocol after said un-asserting of said polite request signal and before said un-asserting of said transmitting indication signal.

23. An apparatus comprising:

a processor [for notifying] *configured to notify* a first transceiver to exit a power save state, wherein said first transceiver communicates in accordance with a first communications protocol via a shared-communications channel; and a first transmitter [for] *configured to*:

[(1) asserting] *assert* a transmitting indication signal that indicates that said first transmitter is transmitting via said shared communications channel in accordance with a second communications protocol; and

[(2) transmitting] *transmit* at least one frame after said notifying and before said first transceiver has recovered from said power save state; wherein said first transmitter constitutes a second transceiver and said first transceiver and said second transceiver are associated with the same host computer.

24. The apparatus of claim 23 further comprising a second transmitter [for transmitting] *configured to transmit* at least one frame from said first transceiver via said shared communications channel after said first transceiver recovers from said power save state, wherein said second transmitter constitutes said first transceiver.

*25. A method comprising:*

*at a first air interface, sending a polite request signal that requests a second air interface relinquish transmitting via a shared-communications channel, wherein the first air interface communicates in accordance with a first communications protocol, and wherein the second air interface communicates in accordance with a second communication protocol;*

*receiving a first signal that indicates that the second air interface has relinquished transmitting via the shared-communications channel; and*

*responsive to receiving the first signal, transmitting at least one frame via the first shared communications channel.*

*26. The method of claim 25, wherein the first air interface is Bluetooth compliant and the second transceiver is IEEE 802.11 compliant.*

*27. The method of claim 25, further comprising:*

*at the first air interface, un-asserting the polite request signal; and*

*at the second air interface, detecting the un-asserting of the polite request signal.*

*28. The method of claim 27, wherein the polite request signal also requests that the second air interface enter a power save state,*

*wherein the first signal also indicates that the second air interface has entered the power save state, and*

*wherein the un-asserting of the polite request signal also requests that the second air interface exit the power save state.*

*29. The method of claim 27, further comprising:*

*at the first air interface, asserting a transmit indication signal before transmitting the at least one frame un-asserting of the transmit indication signal after the un-asserting of the polite request signal; and*

*at the second air interface, detecting the un-asserting of the transmitting indication signal, and indicating via the shared-communications channel that subsequent transmissions are to be directed to the second air interface.*

*30. A method, comprising:*

*at a first air interface, establishing a shared-communication channel, wherein the first air interface communicates using a first communications protocol;*

*receiving a polite request signal requesting access to the shared-communications channel;*

*responsive to receiving the polite request signal, sending a request granted signal granting access to the shared-communications channel;*

*receiving an un-asserted polite request signal; and*

*responsive to receiving the un-asserted polite request signal, receiving at least one frame via the shared-communications channel.*

*31. The method of claim 30, wherein the first air interface is IEEE 802.11 compliant.*

*32. The method of claim 30, wherein the polite request signal and the unasserted polite request signal are received from a second air interface.*

*33. The method of claim 30, wherein the second air interface is Bluetooth compliant.*

*34. The method of claim 30, wherein the polite request signal also requests that the first air interface enter a power save state,*

*wherein the request granted signal also indicates that the first air interface has entered the power save state, and*

*wherein the un-asserted polite request signal also requests that the first air interface exit the power save state.*

*35. The method of claim 30, wherein the first air interface communicates with an access point via the shared-communication channel and wherein receiving at least one frame from the first air interface comprises receiving at least one frame from the access point via the shared-communications channel.*

*36. A station, comprising:*

*a first air interface, comprising:*

*a first transceiver,*

*a first memory, and*

*a first processor, configured to:*

*generate a polite request signal to request a second air interface relinquish transmitting via a shared-communications channel,*

*send the first polite request signal via the first transceiver,*

*receive a first signal indicating the second air interface has relinquished the shared-communication channel, and responsive to receiving the first signal, transmit at least one frame via the first shared-communication channel.*

*37. The apparatus of claim 36, further comprising the second air interface, the second air interface comprising:*

*a second transceiver,*

*a second memory, and*

*a second processor.*

*38. The apparatus of claim 37, wherein the second processor is configured to:*

*receive the polite request signal via the second transceiver;*

*responsive to receiving the polite request signal, send the first signal via the second transceiver;*

*receive an un-asserted polite request signal via the second transceiver; and*

*responsive to receiving the un-asserted*

*polite request signal, receive at least one frame from the second transceiver via the shared-communications channel.*

*39. The apparatus of claim 36, wherein the first air interface enables communication in accordance with a first communications protocol, and wherein the second air interface enables communication over the shared-communication channel in accordance with a second communication protocol.*

*40. The apparatus of claim 39, wherein the first au interface IS Bluetooth compliant and the second air interface is IEEE 802.11 compliant.*

*41. The apparatus of claim 36, further comprising a third air interface that enables communication in accordance with a third communications protocol.*

*42. The apparatus of claim 41, wherein the third air interface comprises:*

*a third transceiver,*

*a third memory, and*

*a third processor.*

*43. An article of manufacture including a tangible computer-readable medium having instructions stored thereon that, if executed by a computing device, cause the computing device to perform operations comprising:*

*at a first interface, sending a polite request signal that requests a second air interface relinquish transmitting via a shared-communications channel, wherein the first air interface communicates in accordance with a first communications protocol, and wherein the second air interface communicates in accordance with a second communication protocol;*

*receiving a first signal that indicates that the second air interface has relinquished transmitting via the shared-communications channel; and*

*responsive to receiving the first signal, transmitting at least one frame via the first shared communications channel.*

*44. The article of manufacture of claim 43, wherein the first air interface is Bluetooth compliant and the second transceiver is IEEE 802.11 compliant.*

*45. The article of manufacture of claim 43, wherein the instructions, if executed by the computing device, further cause the computing device to perform operations comprising un-asserting the polite request signal.*

*46. The article of manufacture of claim 45, wherein the polite request signal also requests that the second air interface enter a power save state,*

*wherein the first signal also indicates that the second air interface has entered the power save state, and*

*wherein the un-asserting of the polite request signal also requests that the second air interface exit the power save state.*

*47. The article of manufacture of claim 45, wherein the instructions, if executed by the computing device, further cause the computing device to perform operations comprising asserting a transmit indication signal before transmitting the at least one frame un-asserting of the transmit indication signal after the un-asserting of the polite request signal.*

*48. An article of manufacture including a tangible computer-readable medium having instructions stored thereon that, if executed by a computing device, cause the computing device to perform operations comprising:*

*at a first air interface, establishing a shared-communication channel, wherein the first air interface communicates using a first communications protocol;*

*receiving a polite request signal requesting access to the shared-communications channel;*

*responsive to receiving the polite request signal, sending a request granted signal granting access to the shared-communications channel;*

*receiving an un-asserted polite request signal; and*

*responsive to receiving the un-asserted polite request signal, receiving at least one frame via the shared-communications channel.*

*49. The article of manufacture of claim 48, wherein the polite request signal and the un-asserted polite request signal are received from a second air interface.*

*50. The article of manufacture of claim 48, wherein the polite request signal also requests that the first air interface enter a power save state,*

*wherein the request granted signal also indicates that the first air interface has entered the power save state, and*

*wherein the un-asserted polite request signal also requests that the first air interface exit the power save state.*

*51. The article of manufacture of claim 48, wherein the first air interface communicates with an access point via the shared-communication channel and wherein receiving at least one frame from the first air interface comprises receiving at least one frame from the access point via the shared-communications channel.*

* * * * *

UNITED STATES PATENT AND TRADEMARK OFFICE

CERTIFICATE OF CORRECTION

PATENT NO. : RE42,721 E
APPLICATION NO. : 12/317669
DATED : September 20, 2011
INVENTOR(S) : Godfrey It is certified that error appears in the above-identified patent and that said Letters Patent is hereby corrected as shown below:

Title Page 2, item (56), under "Other Publications", in Column 1, Line 3, delete "Co-existense" and insert -- Co-existence --.

Column 8, lines 43-44, in Claim 5, delete "shared communications" and insert -- shared-communications --.

Column 8, lines 65-66, in Claim 7, delete "shared communications" and insert -- shared-communications --.

Column 9, line 7, in Claim 8, delete "shared communications" and insert -- shared-communications --.

Column 9, line 38, in Claim 11, delete "the same" and insert -- a same --.

Column 9, line 59, in Claim 14, delete "the transceiver" and insert -- a transceiver --.

Column 9, line 62, in Claim 14, delete "that said the" and insert -- that the --.

Column 10, line 6, in Claim 15, delete "shared communications" and insert -- shared-communications --.

Column 10, line 66, in Claim 20, delete "the transceiver" and insert -- a transceiver --.

Column 11, line 2, in Claim 20, delete "that said the" and insert -- that the --.

Column 11, lines 12-13, in Claim 21, delete "shared communications" and insert -- shared-communications --.

Column 11, line 41, in Claim 23, delete "shared communications" and insert -- shared-communications --.

Signed and Sealed this
Twenty-sixth Day of June, 2012

David J. Kappos

David J. Kappos
*Director of the United States Patent and Trademark Office*

Column 11, line 48, in Claim 23, delete "the same" and insert -- a same --.

Column 11, lines 51-52, in Claim 24, delete "shared communications" and insert -- shared-communications --.

Column 11, line 67, in Claim 25, delete "*shared communications*" and insert -- *shared-communications* --.

Column 12, line 43, in Claim 32, delete "unasserted" and insert -- un-asserted --.

Column 13, line 30, in Claim 40, delete "au" and insert -- air --.

Column 13, line 56, in Claim 43, delete "*shared communications*" and insert -- *shared-communications* --.